US008228984B2

(12) United States Patent
Jeon et al.

(10) Patent No.: US 8,228,984 B2
(45) Date of Patent: Jul. 24, 2012

(54) METHOD AND APPARATUS FOR ENCODING/DECODING VIDEO SIGNAL USING BLOCK PREDICTION INFORMATION

(75) Inventors: Byeong Moon Jeon, Seoul (KR); Seung Wook Park, Seoul (KR); Ji Ho Park, Seoul (KR)

(73) Assignee: LG Electronics Inc., Seoul (KR)

( * ) Notice: Subject to any disclaimer, the term of this patent is extended or adjusted under 35 U.S.C. 154(b) by 1014 days.

(21) Appl. No.: 11/918,217

(22) PCT Filed: Jan. 20, 2006

(86) PCT No.: PCT/KR2006/000234
§ 371 (c)(1),
(2), (4) Date: Aug. 12, 2008

(87) PCT Pub. No.: WO2006/078142
PCT Pub. Date: Jul. 27, 2006

(65) Prior Publication Data
US 2009/0168872 A1      Jul. 2, 2009

Related U.S. Application Data

(60) Provisional application No. 60/645,035, filed on Jan. 21, 2005, provisional application No. 60/648,421, filed on Feb. 1, 2005, provisional application No. 60/649,621, filed on Feb. 4, 2005.

(30) Foreign Application Priority Data

Jun. 10, 2005  (KR) .................. 10-2005-0049908

(51) Int. Cl.
*H04N 7/12*  (2006.01)

(52) U.S. Cl. ............... 375/240.12; 375/240.25; 382/233

(58) Field of Classification Search ............ 375/240.12–240.16, 240.25–240.29; 382/233, 235, 236, 382/238
See application file for complete search history.

(56) References Cited

U.S. PATENT DOCUMENTS 5,818,531 A    10/1998  Yamaguchi et al.
(Continued)

FOREIGN PATENT DOCUMENTS

KR    10-2004-0054747    6/2004
(Continued)

OTHER PUBLICATIONS

International Search Report dated Apr. 28, 2006 for counterpart International Application No. PCT/KR2006/000233.
(Continued)

*Primary Examiner* — Ricky Ngo
*Assistant Examiner* — Kan Yuen
(74) *Attorney, Agent, or Firm* — Harness, Dickey & Pierce, P.L.C.

(57) ABSTRACT

This invention relates to a method and apparatus for encoding video signals based on prediction information of an intra mode block of a sub-layer and decoding the encoded video data accordingly. The method encodes a video signal in a scalable MCTF scheme to output a bit stream of an enhanced layer, and simultaneously encodes the video signal using a pre-determined method to output a bit stream of a base layer. When the video signal is encoded in the MCTF scheme, an image block included in an arbitrary frame of the video signal is coded to be an error value using the uncoded value of pixels adjacent to the image block, on the basis of prediction information of the corresponding block coded as an intra mode, the corresponding block being included in a bit stream of the base layer and corresponding to the image block, and a bit stream including the coded image block is transmitted while constraint information being released.

6 Claims, 8 Drawing Sheets

U.S. PATENT DOCUMENTS

| | | | |
|---|---|---|---|
| 6,002,803 | A | 12/1999 | Qian et al. |
| 6,043,846 | A | 3/2000 | Shen et al. |
| 6,510,177 | B1 | 1/2003 | De Bonet et al. |
| 7,929,606 | B2* | 4/2011 | Jeon et al. ............... 375/240.12 |
| 7,995,654 | B2* | 8/2011 | Boon et al. ............... 375/240.12 |
| 2002/0110194 | A1 | 8/2002 | Bottreau |
| 2002/0159518 | A1 | 10/2002 | Bottreau et al. |
| 2004/0101052 | A1 | 5/2004 | Roh |
| 2006/0013310 | A1 | 1/2006 | Lee et al. |
| 2007/0065030 | A1* | 3/2007 | Shen et al. ............... 382/238 |
| 2007/0098068 | A1* | 5/2007 | Kimata et al. ........... 375/240.12 |

FOREIGN PATENT DOCUMENTS

| | | |
|---|---|---|
| KR | 10-2004-0091686 | 10/2004 |
| KR | 10-2006-0006711 | 1/2006 |
| WO | WO 2006/075240 | 7/2006 |

OTHER PUBLICATIONS

Office Action by Korean Patent Office for counterpart Korean Application 10-2005-0049908, dated Sep. 18, 2008.

Search report dated Sep. 25, 2009 by European Patent Office for counterpart European Application No. 06715734.7.

Bao, Y. et al "A Low-Complexity AVC-based Scalable Video Codec" ISO/IEC JTC1/SC29/WG11—Hong Kong Jan. 2005.

Bao, Y. et al "Low-Complexity AVC-based Scalable Video Codec" ITU-T SG16 Q.6 VCEG-Y 13, Geneva, Nov. 2004.

Schwartz, H. et al. "SVC Core Experiment 2.1: Inter-layer prediction of motion and residual data" ISO/IEC JTC 1/SC 29/WG 11/M11043, Jul. 2004.

Reichel, J. et al—"Scalable Video Model 3.0" ISO/IEC JTC 1/SC 29/WG 11 N6716, Palma de Mallorca, Oct. 2004.

Wiegand, T. Draft ITU-T Recommendation and Final Draft International Standard of Joint Video Specification (ITU-T Rec. J.264 / ISO-IEC 14496-10 AVC) Geneva, May 2003.

Schwartz, J. et al—"SNR-Scalable Extension of H.264/AVC" Frauenhofer Institute for Telecommunications—Berlin—2004 Intl Conf. on Image Processing.

Search report dated Sep. 25, 2009 by European Patent Office four counterpart Application No. 0675733.9.

Moon, B-M, et al. "Inter-layer prediction of the temporally enhanced pictures", ISO/IEC JTC1/SC29/WG11, Hong Kong, Jan. 2005.

Francois, E. "Extended Spatial Scalability" ISO/IEC JTC1/SC29/WG11, Hong Kong, Jan. 2005.

USPTO Notice of Allowance issued Aug. 20, 2010 for U.S. Appl. No. 11/981,212.

V.Rhee and J.D.Gibson, 'Block-level refinement of motion description in layerd H. 261 video', Procedings of 1995 Conference on Signals, Systems and Computers, vol. 2, Nov. 2, 1995, pp. 1408-1412, Pacific Grove, CA, USA.

European Search Report dated Sep. 7, 2010 for Application No. 06 715 733.9.

Screenshot http://ftp3.itu.org/av-arch/video-site/0501_Hon/.

Andreopoulus et al. "Fully-scalable wavelet video coding using in-band motion compensated temporal filtering," Apr. 2003.

Schwartz, H. et al. "MCTF and Scalability Extension of H.264/AVC," Frauenhofer Institute for Telecommunications—Berlin, Dec. 15, 2004.

\* cited by examiner

METHOD AND APPARATUS FOR ENCODING/DECODING VIDEO SIGNAL USING BLOCK PREDICTION INFORMATION

This application is a National Phase entry of PCT Application number PCT/KR2006/000234 filed on Jan. 20, 2006, which claims priority under 35 U.S.C. §§119(e), 120 and 365(c) to U.S. Provisional Application Nos. 60/645,035, 60/648,421 and 60/649,621 filed on Jan. 21, 2005, Feb. 1, 2005 and Feb. 4, 2005, respectively.

1. TECHNICAL FIELD

The present invention relates to a scalable encoding and decoding of a video signal. More particularly, the present invention relates to a method and apparatus for encoding a video signal using prediction information of intra mode blocks of a base layer and decoding the encoded video data accordingly when performing a scalable coding in a motion compensated temporal filter (MCTF) scheme.

2. BACKGROUND ART

It is not easy to allocate bands as wide as a bandwidth for TV signals with respect to digital video signals which are transmitted and received by a mobile phone and a notebook, which are prevalently in use, a mobile television and a handheld PC which will be used prevalently in future. Hence, standard of video compression for mobile devices should provide higher video signal compression efficiency.

Moreover, such mobile devices inevitably have varying inherent capabilities of processing or presenting video signals. Therefore, a compressed image must be variously prepared in advance to correspond to such capabilities, which means that video data having various image qualities, with respect to various combined parameters, such as the number of frames per second, the resolution, and the number of bits per pixel, must be provided for a single image source, thus inevitably placing a great burden on content providers.

On this account, the content providers prepare compressed video data having a high bit rate for each individual image source, and, when the mobile device requests the video data, perform a procedure of decoding a compressed image and encoding the decoded image into video data suitable for the video processing capability of the mobile device that requested the image, and then provides the encoded video data. In doing so, since the transcoding, which implies the decoding and the encoding, is requisite, a time delay occurs until providing the video data requested by the mobile device. Also, the transcoding requires complicated hardware devices and algorithms depending on the variety of encoding targets.

A scalable video codec (SVC) is suggested as a solution for the above disadvantages. The SVC encodes a video signal at maximum quality and allows the video presentation of low quality even when a partial sequence, which is a sequence of a frame selected intermittently from the entire sequence, of the generated picture sequence produced from the encoding. A motion compensated temporal filter (MCTF) scheme is the encoding scheme suggested for the SVC.

As discussed above, while the picture sequence encoded in the scalable MCTF can present the video of low quality merely by receiving and processing the partial sequence, the image quality degrades considerably when the bit rate lowers. To overcome this disadvantage, an auxiliary picture sequence for low transmission rate, for example, a picture sequence having small screen and/or low frames per second may be provided separately. The auxiliary sequence is referred to as a base layer, and the main picture sequence is referred to as an enhanced or enhancement layer. But, since the base layer and the enhanced layer encode the same video signal source, redundant information (redundancy) is present in the video signal in both layers.

Figure 1:
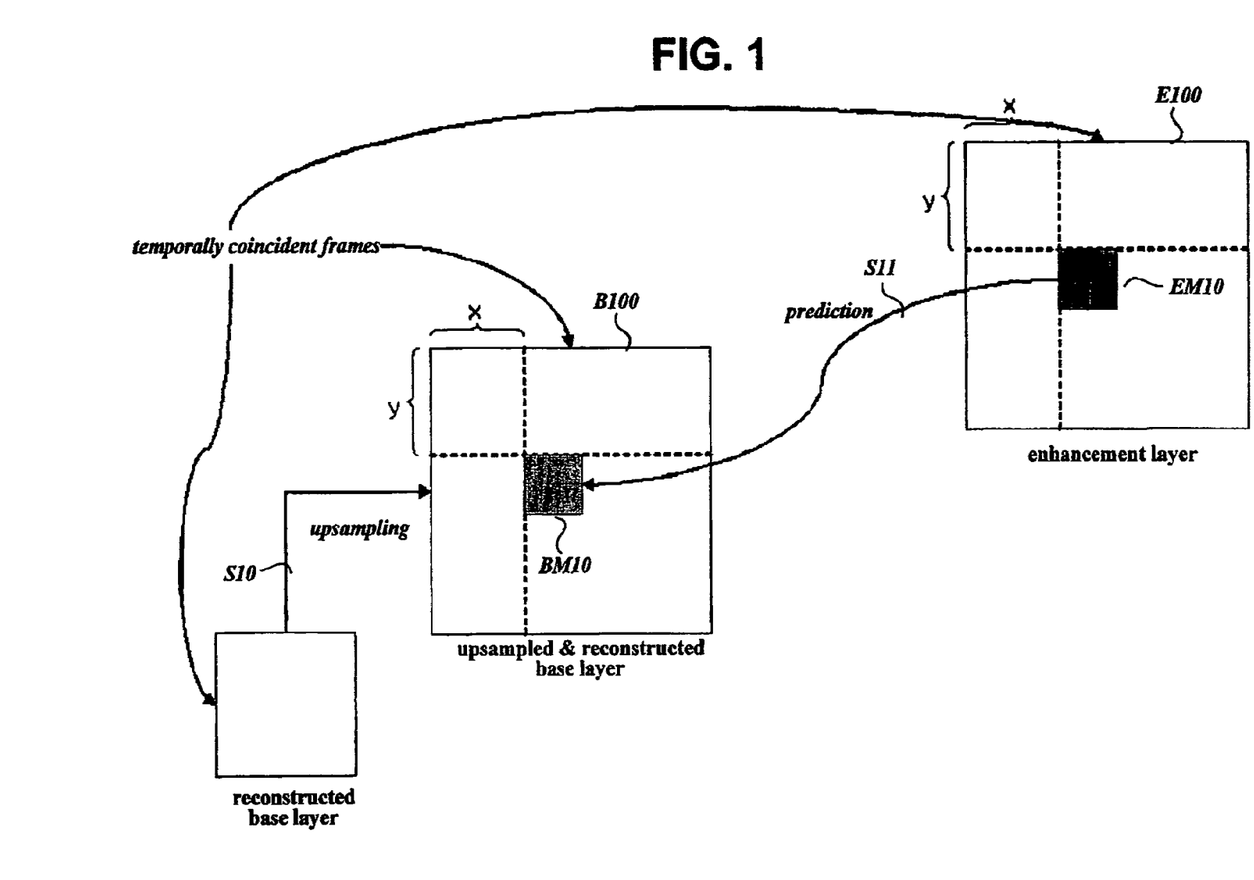
FIG. 1 illustrates a conventional scheme for reconstructing a prediction image of an enhanced layer from a block at the same position in an enlarged frame of a base layer temporally coincident.

To improve the coding efficiency of the enhanced layer encoded according to the MCTF scheme, a prediction image of the enhanced layer is generated from an arbitrary video frame of the base layer temporally coincident with the video frame of the enhanced layer, as shown in FIG. 1.

Referring to FIG. 1, a certain number of macro blocks of the base layer are reconstructed as one picture, and the picture is enlarged to the size equal to the video frame of the enhanced layer by up-sampling the picture (S10). When the macro block BM10, in the enlarged picture B100, at the same position as the macro block EM10 in the frame E100, which is temporally coincident with the enlarged picture B100 of the base layer, of the enhanced layer of which the current prediction image is to be generated, is coded as an intra mode, a prediction procedure for the macro block EM10 of the enhanced layer is carried out based on the macro block BM10 (S11).

In more detail, after the original block image of the macro block BM10, coded in a intra mode, of the base layer is recovered using pixel values of lines adjacent to the macro block BM10, a difference or error value of the recovered block image, that is, residual is encoded to the macro block EM10 of the enhanced layer. The coded macro block EM10 is referred to as an intra BL mode.

The scheme using the original image of the intra mode block of the base layer needs to recover first the original image of the intra mode block of the base layer which is to be used for encoding and decoding image blocks in the arbitrary frame of the enhanced layer, according to the prediction information. The problem is that this recovery requires pretty high hardware complexity.

3. DISCLOSURE OF INVENTION

An object of the present invention is to provide a method and apparatus for coding a video signal to a prediction image in the scalable scheme using the prediction information of the block of the base layer without recovering the image of the intra mode blocks of the base layer.

Another object of the present invention is to provide a method and apparatus for decoding data stream having the encoded block by use of the prediction information of the intra mode blocks of the base layer.

Still another object of the present invention is to provide a method and apparatus for coding an arbitrary macro block to residual data in a BL intra mode using pixel data before the coding of adjacent blocks.

To achieve the above objects of the present invention, the video signal is encoded in a scalable MCTF scheme and output as a bit stream of a first layer, and simultaneously, the video signal is encoded in a preset scheme and output as a bit stream of a second layer. An image block in an arbitrary frame of the video signal is encoded in the MCTF scheme using adjacent pixels of the image block in an intra BL mode based on prediction information of a first block, contained in a bit stream of the second layer, coded in an intra mode.

According to an aspect of the present invention, the prediction information divided into information relating to a prediction mode and information relating to a prediction direction (DoP).

According to an aspect of the present invention, the frames of the second layer are encoded to smaller screen frames than the frames of the first layer.

According to an aspect of the present invention, the image block is split into a plurality of cells based on the prediction mode of the first block and a difference value of each pixel of the cells is acquired and coded by equally applying a prediction direction of a partial area in the first block, corresponding to a group comprising a certain number of the split cells, to the cells in the group.

According to another aspect of the present invention, the image block is split into a plurality of cells in a size which is acquired by multiplying a size set in the prediction mode of the first block by a screen size ratio of the first layer to the second layer, and a difference value of each pixel of a cell is acquired and coded by applying, to the cell, a prediction direction of a partial area of the first block corresponding to the cell.

According to still another aspect of the present invention, a difference value between error data acquired based on the prediction information of the first block and error data of the first block or the partial area of the first block, is coded to the image block.

According to the aspects of the present invention, when acquiring the reference value of the block coded in the intra BL mode, information indicating to use a fixed value for adjacent blocks of a non-intra mode, for example, a constraint field value is released such that restored pixel values of the adjacent blocks, instead of the fixed value, can be used.

4. BRIEF DESCRIPTION OF DRAWINGS

The above and other objects, features and advantages of the present invention will become apparent from the following description of preferred embodiments given in conjunction with the accompanying drawings, in which.

5. MODES FOR CARRYING OUT THE INVENTION

Hereinafter, the embodiments of the present invention will be described in detail with reference to accompanying drawings.

Figure 2:
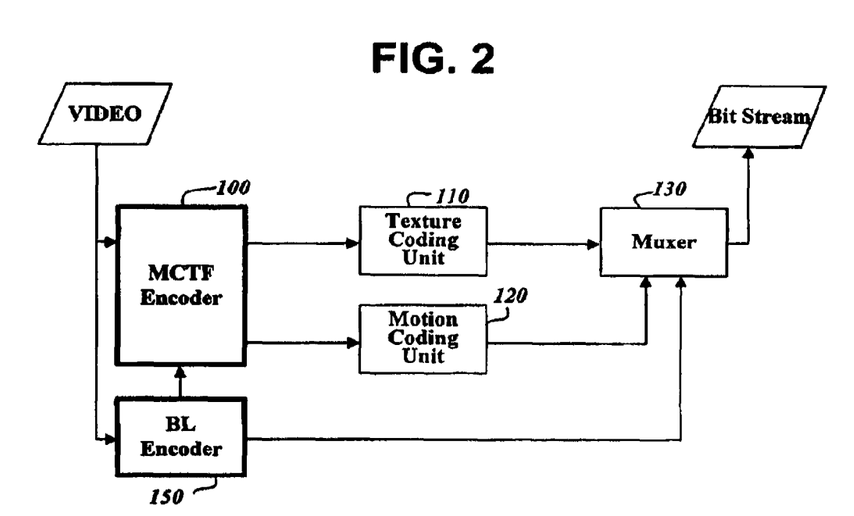
FIG. 2 is a block diagram of a video signal encoding apparatus to which a video signal coding method is applied.

FIG. 2 is a block diagram of a video signal encoding apparatus to which a video signal scalable coding method in accordance with the present invention is applied.

In FIG. 2, the video signal encoding apparatus, to which the present invention is applied, includes a MCTF encoder 100, a texture coding unit 110, a motion coding unit 120, a base layer (BL) encoder 150, and a muxer 130. The MCTF encoder 100 encodes an incoming video signal by unit of macro blocks according to the MCTF scheme, and generates proper management information. The texture coding unit 110 converts the information of the encoded macro blocks to a compressed bit stream. The motion coding unit 120 codes motion vectors of the image blocks acquired at the MCTF encoder 100, to a compressed bit stream according to a predefined scheme. The BL encoder 150 generates a sequence of small screens, for example, a sequence of pictures which is 25% of the original size by encoding the incoming video signal according to a predefined scheme, for instance, according to MPEG 1, 2, or 4, or H.261, H.263 or H.264. The muxer 130 encapsulates the output data of the texture coding unit 110, the small screen sequence of the BL encoder 150, and the output vector data of the motion coding unit 120 in a preset format, multiplexes them in a preset transmission format, and outputs the multiplexed data.

The MCTF encoder 100 performs motion estimation and prediction with respect to the macro blocks in an arbitrary video frame, and updating which adds image difference with macro blocks in an adjacent frame, to a corresponding macro block.

Figure 3:
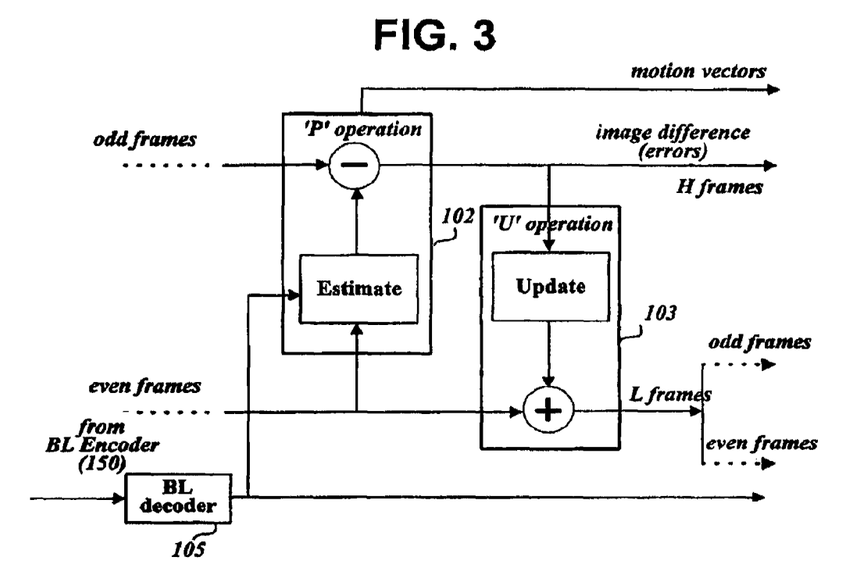
FIG. 3 illustrates video estimation/prediction and updating in the MCTF encoder of FIG. 2.

The MCTF encoder 100 divides the incoming video frame sequence to, for example, odd and even frames, and performs the motion estimation/prediction and the updating over several times, for example, until one group of pictures (GOP) has only one L frame, which is the resultant frame by the updating. FIG. 3 shows the estimation/prediction and the updating of one step, which is referred to as a MCTF level, of the several steps.

In FIG. 3, a BL decoder 105, an estimation/prediction unit 102, and an update unit 103 are included. The BL decoder 105 extracts encoding information, such as frame rate and macro block mode, from the base layer stream of the small screen sequence encoded at the BL encoder 150. With respect to each macro block in the frame to be coded to have residual data, the estimation/prediction unit 102 detects reference blocks in the previous or next adjacent frame through the motion estimation, codes image difference between the reference blocks and a corresponding block, and directly calculates motion vectors with respect to the reference blocks, or the estimation/prediction unit 102 codes the macro block using information of macro blocks extracted by the BL decoder 105. The update unit 103 performs an update operation, with respect to each macro block which is detected as the reference block in the motion estimation, of normalizing the image difference obtained in the motion estimation, and then adding the image difference to the corresponding macro block. The operation conducted at the update unit 103 is referred to as a U operation, and a frame generated through the U operation is referred to as an L frame.

The estimation/prediction unit 102 and the update unit 103 of FIG. 3 can process a plurality of slices which are splits of one frame, rather than the video frames, at the same time in parallel. A frame or slice having the image difference generated by the estimation/prediction unit 102 is referred to as an H frame or slice. Data of the difference value in the H frame or slice reflects a high frequency component of the video signal. Hereafter, it is considered that the term 'frame' implies the slice when the technical equivalence is maintained.

The estimation/prediction unit 102 splits the incoming video frames or the L frames acquired at the previous phase into macro blocks in a preset size, detects a block having the highest correlation with the image of the split macro blocks from previous and/or next frames temporally adjacent, generates a prediction image based on the detected frames and calculates the motion vectors. If the block having the correlation greater than a proper threshold is not detected, and there is no information relating to the temporally coincident frame in the encoding information provided from the BL decoder 105 or the corresponding block in the temporally coincident frame, that is, the block at the relatively same position in the frame, is not the intra mode, the current macro block is coded in the intra mode using adjacent pixel values. This operation is referred to as a P operation, and an H frame is generated through the P operation. This operation is well known to one skilled in the art, and thus detailed descriptions thereof, which are out of the scope of the invention, will be omitted for clarity. According to embodiments of the present invention, how to encode the macro blocks that have not motion-estimated into the prediction image having residual data, using the prediction information of the intra-mode blocks of the base layer temporally coincident is explained in detail in reference to FIGS. 4A through 4C and FIGS. 5A through 5C.

Figure 4A:
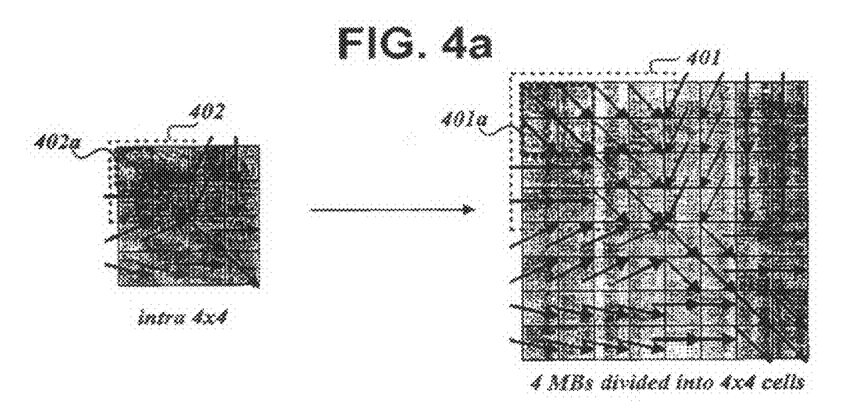
FIGS. 4A, 4B, and 4C illustrate how to code the macro blocks of the enhanced layer as BL intra mode using prediction information of an intra mode block of the base layer according to one embodiment of the present invention.
Figure 4B:
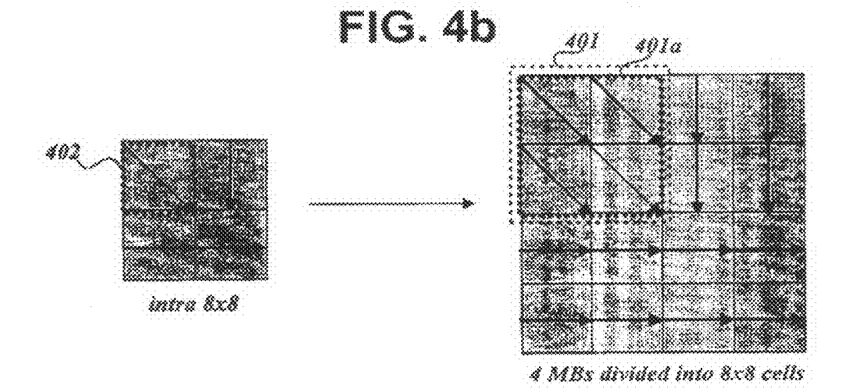
Figure 4C:
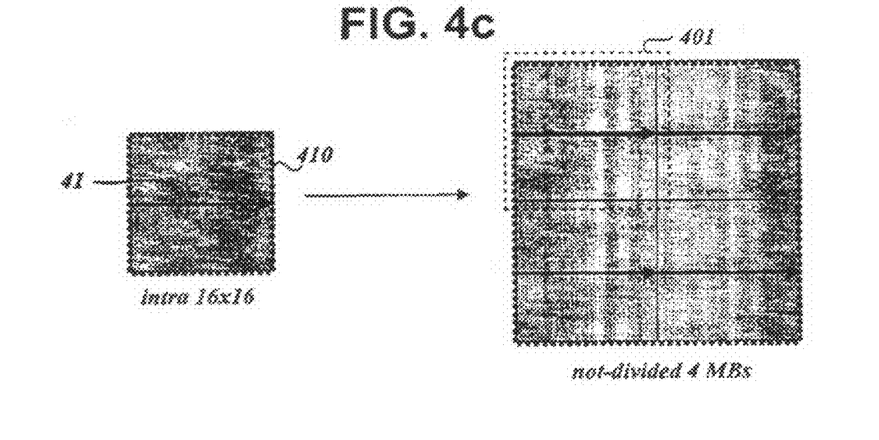

First, one embodiment of the present invention is now explained in reference to FIGS. 4A through 4C.

If it is confirmed from the encoding information provided from the BL decoder 105 that the corresponding block in the frame temporally coincident is the intra mode, the estimation/prediction unit 102 checks a prediction mode and a prediction direction (DoP) of the corresponding block. Herein, the corresponding block indicates a block at the relatively same position in the frame as the current macro block of the enhanced layer when the enhanced layer equals to the base layer in the screen size. When the enhanced layer is greater than the base layer in the screen size, the corresponding block indicates a block having the image area which covers the current macro block of the enhanced layer after the frame of the base layer is scaled up to the frame size of the enhanced layer.

In one embodiment of the present invention, the screen size of the frame encoded by the MCTF encoder 100 is four times as large as the screen size of the frame encoded by the BL encoder 150. Accordingly, the two screen sizes are different from each other.

In one embodiment of the present invention, the BL encoder 150 uses intra mode types, that is, predictions modes of intra 4×4, intra 8×8, and intra 16×16 with respect to the intra BL mode, as shown in FIGS. 4A through 4C, respectively. The BL encoder 150 uses nine DoPs (e.g., directions of arrow in the drawings) for intra 4×4 and intra 8×8, and uses four DoPs for intra 16×16.

The estimation/prediction unit 102 confirms the prediction mode and then splits the current macro block 401 into cells according to the prediction mode of the base layer. In specific, when the prediction mode of the base layer is the intra 4×4 as shown in FIG. 4A, the current macro block 401 is split into cells having 4×4 size. As for the intra 8×8 mode as shown in FIG. 4B, the current macro block 401 is split into cells having 8×8 size. As for the intra 16×16 mode as shown in FIG. 4C, the current macro block 401 is split into cells having 16×16 size. A reference value is acquired from necessary adjacent pixels based on DoP information of the corresponding macro block of the base layer with respect to each cell. Next, a difference value (error value) from the reference value is coded by applying the DoP.

In one embodiment of the present invention, the macro block 401 of the enhanced layer has pixels corresponding to the image which is a quarter of the corresponding macro block of the base layer. Since the current macro block 401 is split into the cells that equal to the prediction mode of the corresponding macro block of the base layer, more DoP information, that is, four times as much as used in the corresponding block is required. The quarter partial block 402 of the macro block of the base layer, corresponding to the current macro block 401, includes four DoP information as for the intra 4×4 type as shown in FIG. 4A, and includes one DoP information as for the intra 8×8 type as shown in FIG. 4B. For each case, the number of cells split in the current macro block is 16 and 4 respectively. Accordingly, the number of split cells is greater than the number of usable DoP by the screen size ratio between the layers, for example, by four times.

Thus, the estimation/prediction unit 102 groups the split cells of the current macro block 401 in units of four cells and then performs the intra BL mode coding by uniformly using the DoP of the area corresponding to each cell group in the quarter partial block 402. For instance, in FIG. 4A, four cells of a top left cell group 401a each are coded to the intra BL mode by equally using the DoP information of a top left cell 402a of the quarter partial block 402 in the corresponding block. In FIG. 4B, four cells in a cell group 401a, which equals to the macro block 401 in size, each are coded to the intra BL mode by equally using the DoP information of the quarter partial block 402 of the base layer corresponding to the cell group 401a. The same principle applies to the other cell groups of the macro block or the other macro blocks.

The intra BL mode coding, according to the set DoP, properly selects the pixel values of the adjacent left and/or upper pixel line and codes a difference value (residual) of the pixels based on the average, or codes a difference value (residual or error value) with a value which is acquired by properly interpolating pixel values of the two adjacent lines according to the DoP.

Meanwhile, as shown in FIG. 4C, when the corresponding block of the base layer is coded to the intra 16×16, that is, when one 16×16 macro block is coded according to one DoP 41, the estimation/prediction unit 102 codes not only the current macro block 401 but also three macro blocks that are adjacent to the macro block 401 with the same corresponding block 41, to the error value by uniformly using the DoP 41 of the corresponding block 410.

In another embodiment of the present invention, the estimation/prediction unit 102 splits the current macro block 401 into cells based on the prediction mode relating to the corresponding block of the current macro block 401 and the screen size ratio of the frame which is coded in comparison with the frame of the base layer.

Figure 5A:
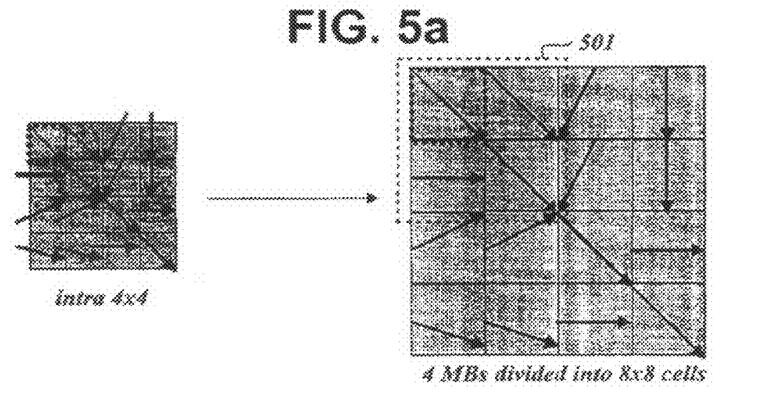
FIGS. 5A, 5B, and 5C illustrate how to code the macro block of the enhanced layer as BL intra mode using prediction information of an intra mode block of the base layer according to another embodiment of the present invention.
Figure 5B:
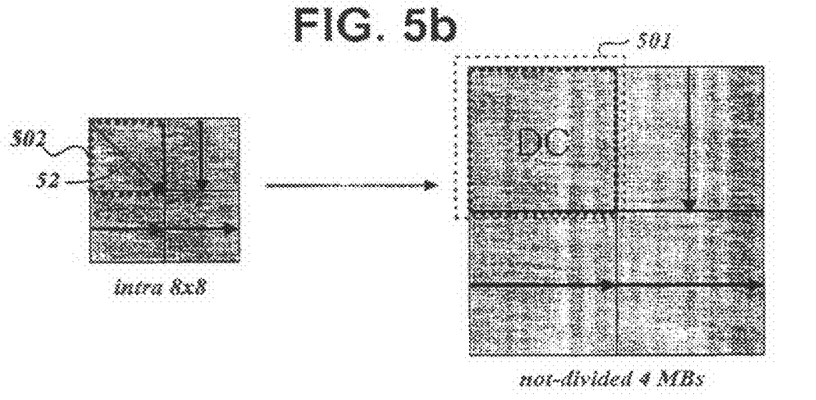
Figure 5C:
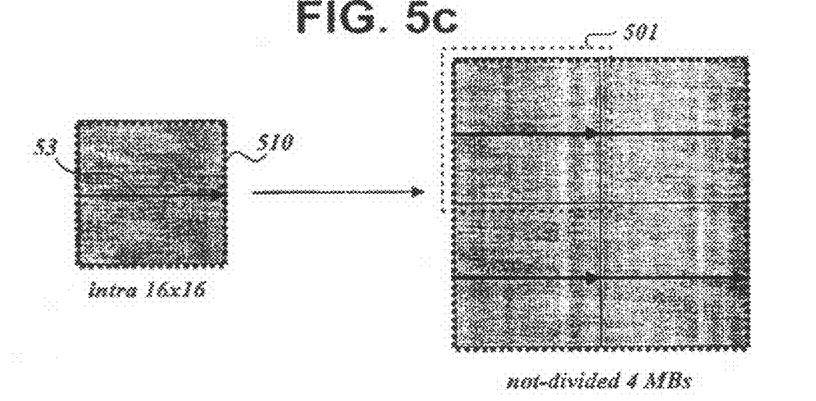

Under conditions that the screen size of the enhanced layer frame is four times as large as the base layer frame, if the intra-mode block of the base layer is the intra 4×4 mode as shown in FIG. 5A, a current macro block 501 is split to cells having 8×8 size corresponding to four times of the intra 4×4 mode. As for the intra 8×8 mode as shown in FIG. 5B, the current macro block 501 is not split because the size by the four times as large as the intra 8×8 is equal to the size of the current macro block 501. This also applies to the intra-mode 16×16 of the corresponding block of the current macro block 501 as shown in FIG. 5C.

In another embodiment of the present invention, when the macro block is split, the split cells correspond to the DoP information in the 4×4 partial area of the corresponding block one by one, as shown in FIG. 5A. Hence, the estimation/prediction unit 102 codes to the error value using the DoP information of the 4×4 area spatially corresponding to the split cells of the macro block 501.

However, while using the mode having the size greater than the intra-coded mode in the arbitrary macro block of the base layer, for example, in case of using the intra 8×8 of the base layer, when the higher intra 16×16 is used in the enhanced layer, the same DoP may not be used. For instance, as shown in FIG. 5B, when the corresponding block of the base layer is coded to the intra 8×8 and the quarter partial block 502 in the corresponding block corresponding to the current macro block 501 has the diagonal DoP 52, the current macro block 501 should use the diagonal DoP in the intra 16×16 mode. But, the intra 16×16 mode is unavailable because the diagonal DoP is not defined in the four DoP of the intra 16×16 mode.

As such, when it is impossible to use the DoP information of the corresponding block, the estimation/prediction unit 102 takes advantage of a DC coding or a plane coding based on the pixel values of the two adjacent lines and/or the fixed value, for instance, based on the average of the summation with 128, regardless of the direction with respect to the current macro block 501 as shown in FIG. 5B.

In case that the corresponding block is coded to the intra 16×16 as shown in FIG. 5C, it is impossible to split the current macro block 501 and adjacent three blocks, together with the current macro block 501, have the same corresponding block 510. Accordingly, the coding to the error value is executed using one DoP 53 of the corresponding block 510 in common with respect to the four macro blocks. This is the same as in FIG. 4C.

After the intra BL mode coding, the estimation/prediction unit 102 records mode information informing that the coding is carried out using the DoP of the corresponding block of the base layer, in header information of the macro block, for example, in the block mode. The mode information is discriminated from the information indicating the intra-mode which is coded using the adjacent pixels of the enhanced layer without using the prediction information of the intra-mode block of the base layer.

According to another embodiment of the present invention, after temporarily storing the residual block which is intra-coded with respect to the current macro block according to the schemes as shown in FIGS. 4A through 4C or FIGS. 5A through 5C, a pixel difference value between the temporary block and the corresponding block of the base layer or the partial area of the corresponding block may be coded to the macro block. That is, the difference between the intra-mode coded error data is coded. For doing so, the BL decoder 105 provides the encoded video frames as well as extracts the encoding information from the base layer stream. When the enhanced layer differs from the base layer in screen size, the encoded video frame of the base layer is enlarged according to the ratio through the up-sampling and provided to the estimation/prediction unit 102.

Meanwhile, as described earlier, when the current macro block is coded as the intra BL mode using the prediction information of the corresponding block of the base layer, if a previous block adjacent to the current macro block is coded as the inter-frame mode, instead of substituting the pixel values of an adjacent line belonging to the previous block by, for example, a fixed value of 128, the reference value to calculate the difference value of the pixels of the current macro block is acquired using the original pixel values before the coding. The difference value of each pixel of the current macro block is acquired based on the reference value (and the reference value acquired from pixel values of another adjacent block of the intra mode.

Figure 6:
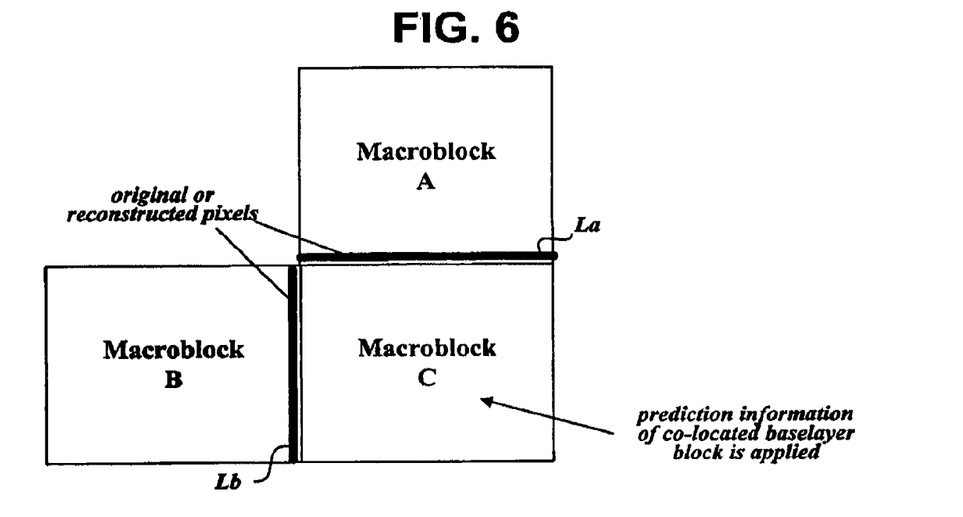
FIG. 6 illustrates an exemplary coding of a macro block in the BL intra-mode using original values of adjacent pixels according to an embodiment of the present invention.

In an example of FIG. 6, a current block is C and one of an upper block A and a left block B, which are adjacent to the current block C, is non-intra mode. If residual data currently coded to the non-intra mode block is acquired from a reference block of another frame, the residual data is substituted by block data stored before the coding with respect to the block. A reference value required to apply DoP of the corresponding block of the base layer to the current block C is acquired using the pixel values along a line La and/or Lb adjacent to the current block C in the substituted data. As such, since the reference value is acquired from the original pixel values having high correlation with the pixel data of the current block C, the residual data of the current block C being coded is highly likely to have small values. This stochastically decreases quantity of transmitted information.

According to the embodiment of the present invention, rather than coding the macro block of the intra BL mode using the residual data based on the data of the corresponding block of the base layer, only the prediction information of the corresponding block is utilized. Thus, the relationship between the inter-layer data is eliminated in comparison with the related art.

Figure 7A:
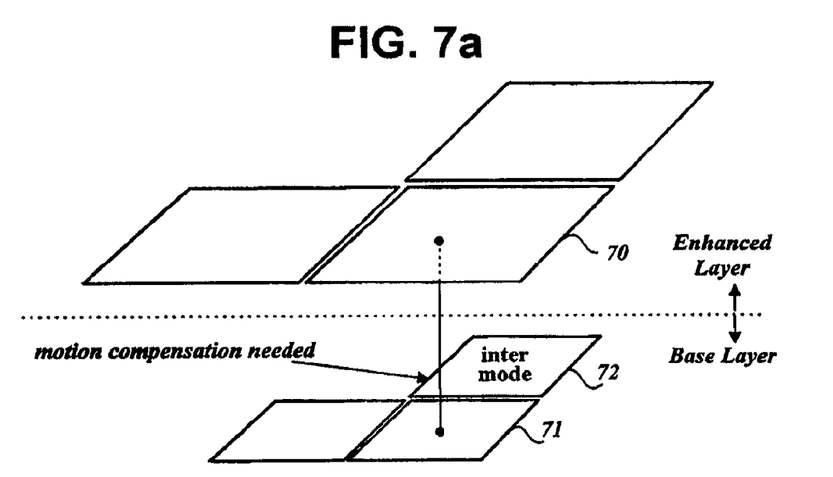
FIG. 7A illustrates an example in which motion compensation should be performed with respect to a lower layer block when coding a current block according to inter-layer data connectivity.

In the related art, due to the presence of the inter-layer data connectivity, the corresponding block of the base layer should be restored to the data before the coding for the sake of the coding with respect to the current block. As shown in FIG. 7A, in case that a block 72 adjacent to a corresponding block 71 of the intra mode of the base layer is an inter-frame mode, when the corresponding block 71 is coded using a reference value which is acquired based on pixel values of the adjacent block before the coding, data before the coding should be restored by performing the motion compensation with respect to the adjacent block 72 of the corresponding block 71 of the base layer. In the restored data, a reference value is acquired from pixel values of the line adjacent to the corresponding block 71. The data of the corresponding block 71 before the coding is restored using the reference value. That is, to code the block 70 of the current layer as the intra BL mode, the motion compensation needs to be carried out with respect to the adjacent block 72 of the corresponding block 71 of the lower layer, that is the base layer. This also applies to the decoding. However, because this excessively raises the hardware complexity, to avoid the motion compensation of the inter-frame mode block adjacent to the corresponding block of the current block, the reference value is acquired and used by substituting the adjacent block coded as the inter-frame mode by a fixed value, for example, by 128. To inform the decoder of the reference value, a constraint variable, which is recorded in the header of the data stream, for example, in the sequence header, is set to 1. When the constraint variable is set to 1, the motion compensation is not performed if the adjacent block is the inter-frame mode as restoring the intra mode block to the data before the coding. Instead, the reference value is acquired by substituting the boundary pixel values by 128, and the data of the intra mode block is restored based on the reference value.

By contrast, in the embodiment of the present invention, since the inter-layer data connectivity of the intra BL mode is removed, to code or decode the intra BL mode of the current layer, it is not necessary to restore the corresponding block of the lower layer to the data before the coding. Thus, it is unnecessary to set the constraint variable to 1 when encoding the lower layer. This also applies to the current enhanced layer. Preferably, the MCTF encoder 100 sets the constraint variable to 0. The constraint variable is set to 0 with respect to the current enhanced layer because there may be an upper layer.

For instance, the current enhanced layer is CIF (at this time, the base layer is QCIF), 4CIF layer is present above the CIF, and an arbitrary block of the 4CIF layer is coded as the intra BL mode according to an embodiment of the present invention. In this case, since there is no data connectivity with the CIF layer, the constraint variable is set to 0 with respect to the current CIF layer. When coding the block of the intra mode or the intra BL mode, a reference value for error coding of the current block is acquired using the pixel values before the coding as the pixel values of the adjacent block of the inter-frame mode. To code the block of the intra BL mode of the 4CIF, the motion compensation of the current CIF layer block is not required.

Figure 7B:
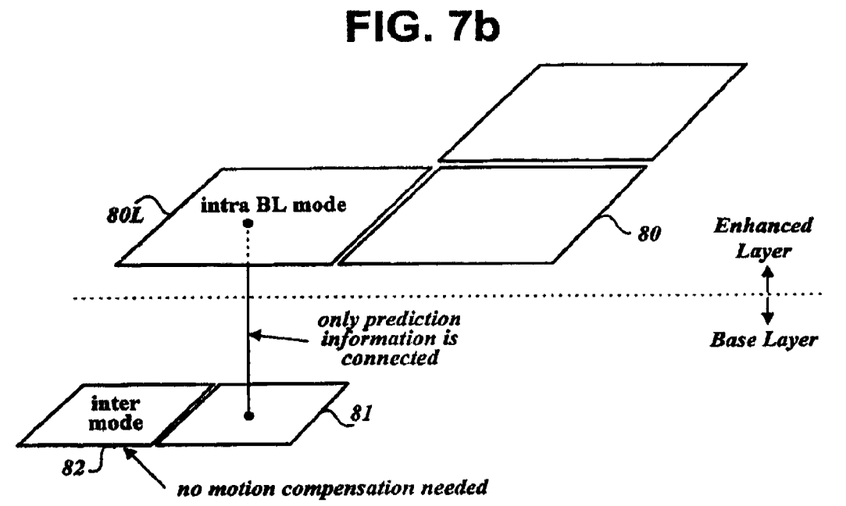
FIG. 7B illustrates facilitated data restoring with respect to the adjacent blocks of the current block due to elimination of the inter-layer data connectivity, according to an embodiment of the present invention.

Additionally, even when the contrast value is set to 0 according to an embodiment of the present invention, the inter-layer data connectivity is removed with respect to the block of the intra BL mode. Thus, the data before the coding can be simply restored with respect to the adjacent blocks of the current block. For instance, as shown in FIG. 7B, in case that a left block 80L adjacent to a current block 80 is coded as the intra BL mode, the related art performs the motion compensation to an adjacent block 82, which is the inter-frame mode, of a corresponding block 81 of the left block 80L when the base layer is set to constraint=0. By contrast, in the embodiment of the present invention, since only the prediction information of the corresponding block 81 is required, the coding data of the left block 80L can be restored easily to its original data. Accordingly, in one embodiment of the present invention, for the intra BL coding of the current block C in FIG. 6, the data before the coding is restored from the current coded data, rather than using the data before the coding stored in the adjacent blocks A and B.

When restoring the adjacent blocks A and B, as for coding as the inter-frame mode, the data of the base layer may be referred to if necessary since the data is coded to the difference between the residual data based on the reference block and the residual data of the corresponding block of the base layer. However, the residual data of the corresponding block is referred to, and the data restoring is unnecessary. The estimation/prediction unit 102 can acquire the residual data directly from the encoded stream which is provided from the BL decoder 105. Hence, there is no difficulty in restoring the adjacent blocks A and B to the original data and use the original data.

As described above, all or part of the encoded data stream, according to the channel capacity, is transmitted to a decoding apparatus by cable or by radio, or by way of a recording medium. The decoding apparatus restores the original video signal of the enhanced layer and/or the base layer as follows.

Figure 8:
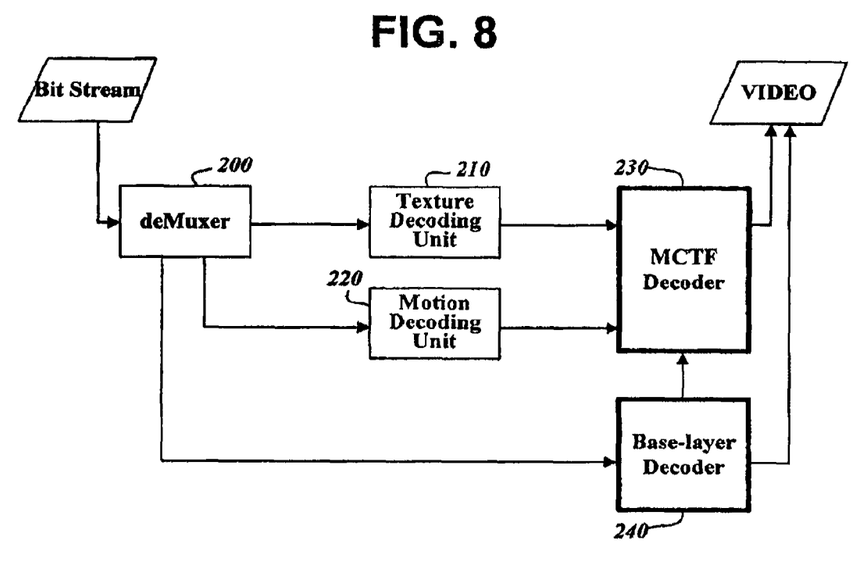
FIG. 8 is a block diagram of an apparatus which decodes the data stream encoded by the apparatus of FIG. 2.

FIG. 8 is a block diagram of an apparatus which decodes the data stream encoded by the encoding apparatus of FIG. 2. The decoding apparatus of FIG. 8 includes a demuxer 200 which separates a compressed motion vector stream and a compressed macro block information stream from the received data stream, a texture decoding unit 210 which restores the compressed macro block information stream to its original non-compressed state, a motion decoding unit 220 which restores the compressed motion vector stream to its original non-compressed state, a MCTF decoder 230 which inversely converts the decompressed macro block information stream and the decompressed motion vector stream to the original video signal according to the MCTF scheme, and a BL decoder 240 which decodes the base layer stream according to a predetermine scheme, for example, according to MPEG4 or H.264. The BL decoder 240 decodes the incoming base layer stream, and simultaneously provides header information in the stream to the MCTF decoder 230, to thus allow utilization of the required encoding information of the base layer, for example, the prediction information of the intra-mode block.

Figure 9:
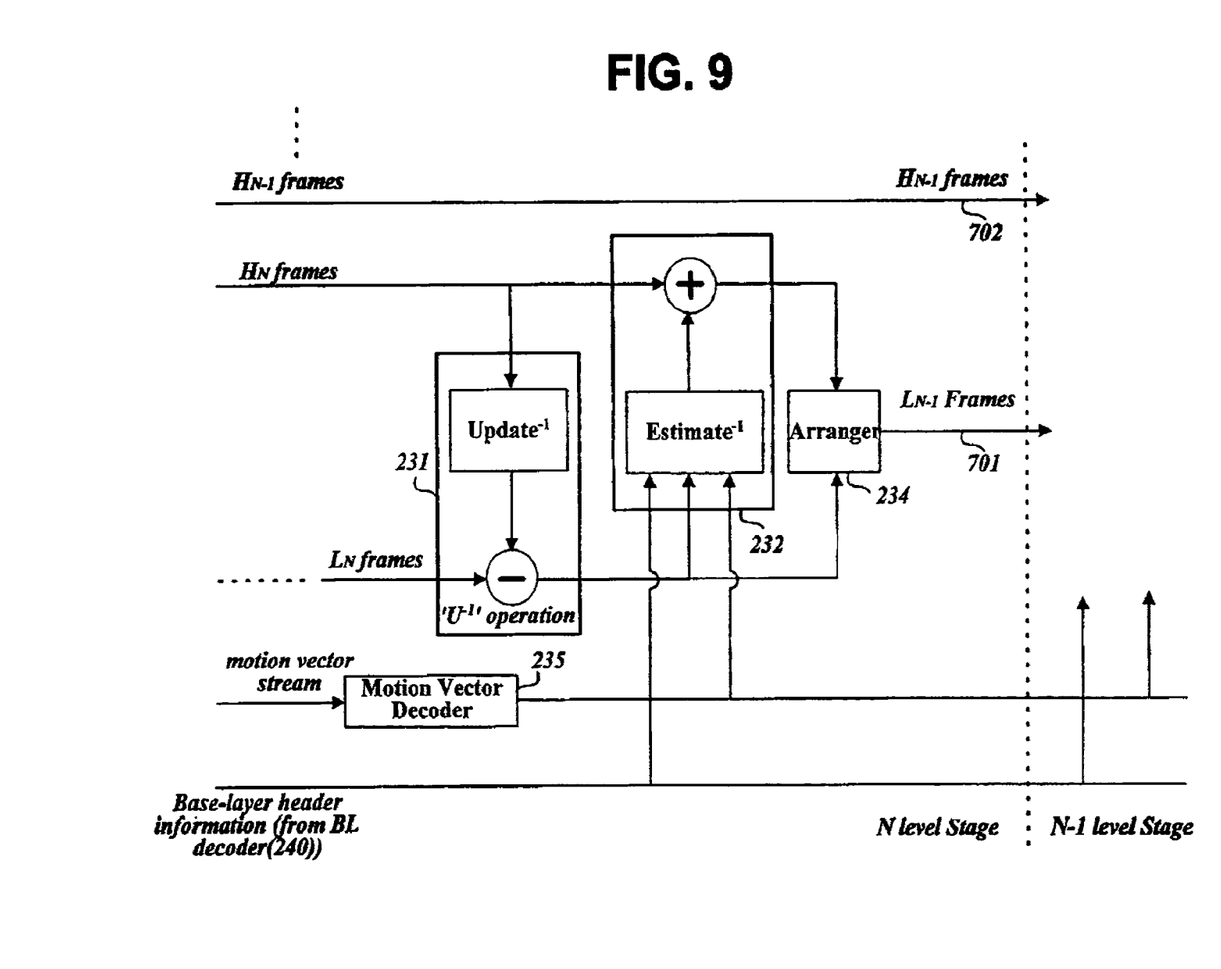
FIG. 9 illustrates a construction for performing inverse prediction and inverse updating in the MCTF decoder of FIG. 8.

To restore the original frame sequence from the incoming stream, the MCTF decoder 230 includes components as shown in FIG. 9.

The MCTF decoder 230 of FIG. 9 is configured to restore H and L frame sequences of the MCTF level N to the L frame sequence of the level N−1. In FIG. 9, an inverse update unit 231 subtracts a difference value of pixels of the incoming H frames from the L frames, an inverse estimation unit 232 restores the L frames having the original image using the L frames, which the image difference of the H frames is subtracted from, and the H frames, a motion vector decoder 235 decodes the incoming motion vector stream and provides the motion vector information of the macro blocks of the H frames to the inverse estimation unit, such as estimation unit 232, in stages, respectively, and an arranger 234 which produces the L frame sequence in the normal order by interleaving the L frames completed by the inverse estimation unit 232 to the output L frames of the inverse update unit 231.

The L frames output from the arranger 234 becomes the L frame sequence 701 at the level N−1. The L frame sequence 701, together with the incoming H frame sequence 702 of the level N−1, is restored to the L frame sequence by an inverse update unit and an inverse estimation unit of the next stage. This process is performed as much as the MCTF level at the encoding, and thus the original video frame sequence is restored.

The restoring of the H frames to the L frames at the level N is explained in detail according to an embodiment of the present invention. First, with respect to an arbitrary L frame, the inverse update unit 231 subtracts the error value of all the macro blocks in the H frames, of which the image difference is acquired based on the reference block being a block in the arbitrary L frame, from the corresponding block of the arbitrary L frame.

The inverse estimation unit 232 restores, with an arbitrary H frame, the macro blocks to its pixel values according to a well-known scheme based on the motion vector information provided from the motion vector decoder 235, excluding the macro block which is intra-coded using the prediction information of the corresponding block of the base layer.

To restore the original image with respect to the macro block in which the header information indicates the coding as the intra BL mode using the prediction information of the corresponding block of the base layer, the motion vector decoder 235 first checks the prediction information (the prediction mode and the DoP information) of the corresponding block of the base layer provided from the BL decoder 240, and restores the original pixel values of the current macro block coded as the intra BL mode accordingly.

Referring back to FIGS. 4A through 4C in which the cells are split in the same size as the prediction mode of the corresponding block of the intra-mode of the base layer and the DoP is used, the inverse estimation unit 232 splits the current macro block into cells in the same mode as the prediction mode (intra 4×4 or intra 8×8) of the corresponding block, and acquires the original pixel values of the cells by duplicating the DoP information of the corresponding block of the base layer, for example, by duplicating it four times if the screen size ratio is 4 and applying them to the four adjacent split cells. In case of the unsplittable prediction mode, that is, in case of the intra 16×16 as shown in FIG. 4C, the original pixel values of the current macro block are restored using the DoP of the corresponding block.

The method for restoring the original pixel values using the DoP of the corresponding block acquires a reference value applied to the pixels according to the corresponding DoP, from the adjacent macro blocks previously restored or the original pixel values, and then restores the original pixel values by adding the reference value and the current difference value of the pixel. Meanwhile, even when the macro blocks adjacent to the current macro block are the inter-frame mode, upon conforming constraint=0 set in the header information contained in the incoming sequence by the MCTF decoder 230, the inverse update unit 232 uses the restored pixel value, that is, the decoded pixel values without substituting the pixel values of the adjacent line with 128 to acquire the reference value. Since three previous blocks adjacent to the current macro block, that is, the left block, the upper block, and the top left block are restored prior to the current block in the decoding, there is no problem in using the original pixel values. As described earlier, even when the adjacent blocks are coded as the intra BL mode, there is no problem to utilize the original pixel values of the adjacent block of the intra BL mode because the adjacent block is simply restored prior to the current macro block merely using the prediction information, which is provided from the BL decoder 240, of the base layer corresponding to the adjacent block.

Referring back to FIGS. 5A through 5C in which the cells are split in the mode which multiplies the size of the prediction mode of the corresponding block of the base layer by the screen size ratio, for example, by 4, the inverse estimation unit 232 splits into the cells of 8×8 if the prediction mode of the corresponding block is the intra 4×4, and acquires the original pixel values of the cells by applying the DoP information of the 4×4 area in the corresponding block one by one (FIG. 5A). In case of the unsplittable prediction mode, that is, the intra 8×8 and the intra 16×16 (FIGS. 5B and 5C), the original pixel values of the current macro block is restored using the DoP of the corresponding block. However, since a higher mode of the prediction mode applied to the blocks of the base layer is applied to the blocks of the enhanced layer, it may be impossible to apply the DoP applied to the blocks of the base layer to the current macro block as shown in FIG. 5B. In this case, the inverse estimation unit 232 restores the original pixel values by performing the inverse operation of the preset scheme, for example, the DC or the plane prediction.

In the embodiment which codes the difference between the error data with respect to the blocks of the enhanced layer using the prediction information of the intra-mode block of the base layer, after the pixel values of the current macro block are added with the pixel values of the corresponding block of the base layer or the partial area of the corresponding block, the original pixel values are restored using the prediction information of the corresponding block as explained earlier. For doing so, the BL decoder 240 provides the base layer frames before the decoding to the MCTF decoder 230. When the enhanced layer and the base layer are different from each other in the screen size, the base layer frames are enlarged according to the difference ratio and then provided.

One frame is processed by a certain unit, for example, by slices in parallel, and the original image of all of the macro blocks in the frame is restored. Next, the complete video frame is reconstructed by combining them all.

As such, the data stream encoded in the MCTF scheme is restored to the complete video frame sequence using the prediction information of the intra-mode block of the base layer. The decoding apparatus can be mounted in a mobile communication terminal or a device which reproduces the recording medium.

As set forth above, in the MCTF encoding, when the intra-mode block is reconstructed using the encoding information of the base layer, which is provided for the decoder having low capability, in addition to the frames of the enhanced layer, the hardware complexity of the encoding apparatus can be lowered. Furthermore, as for the coding as the intra mode or the intra BL mode, the residual coding is possible based on the original pixel values at the boundary of the adjacent block. Therefore, the quantity of the coding information can be stochastically reduced as comparing to the case based on the fixed value. That is, the coding gain can be increased.

Although a few embodiments of the present invention have been shown and described, it would be appreciated by those skilled in the art that changes may be made in these embodiments without departing from the principles and spirit of the invention, the scope of which is defined in the claims and their equivalents.

The invention claimed is:

1. A method for decoding a video signal, comprising:
receiving a bitstream of a first layer and a bitstream of a second layer;
extracting a difference value of corresponding block from the bitstream of the second layer;
extracting a prediction information of the corresponding block coded in an intra mode from the bitstream of second layer;
extracting a difference value of an image block from the bitstream of the first layer; and
restoring the image block of the first layer based on adjacent pixels of the image block, the prediction information, the difference value of the corresponding block, and the difference value of the image block.

2. The method of claim 1, wherein the corresponding block is a block at the same position as the image block or a block covering an area of the same position, and the corresponding block is temporally coincident with the image block.

3. The method of claim 1, wherein the prediction information includes an information relating to a prediction mode and an information relating to a prediction direction.

4. The method of claim 3, wherein the prediction mode is selected to one of intra 4×4, intra 8×8 and intra 16×16.

5. The method of claim 1, further comprising:
extracting a header information from the bitstream of the first layer;
wherein the restoring is performed when header information of the image block indicates the intra-coding using prediction information of the corresponding block of the second layer.

6. An apparatus for decoding a video signal, comprising:
a de-muxer configured to receive a bitstream of a first layer and a bitstream of a second layer;
a base layer decoder configured to extract a difference value of corresponding block from the bitstream of the second layer, and extract a prediction information of the corresponding block coded in an intra mode from the bitstream of the second layer; and, a motion compensated temporal filter (MCTF) decoder configured to extract a difference value of an image block from the bitstream of the first layer, restore the image block of the first layer based on adjacent pixels of the image block, the prediction information, the difference value of the corresponding block, and the difference value of the image block.

* * * * *